June 25, 1946.     T. COWEN     2,402,605
MOISTUREPROOF WRAPPER FOR PACKAGING CHEESE AND THE LIKE
Filed Nov. 4, 1943
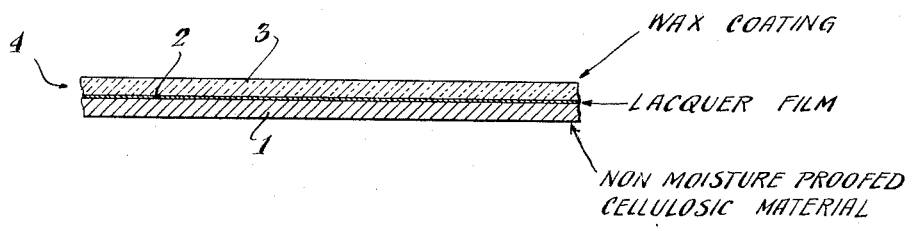
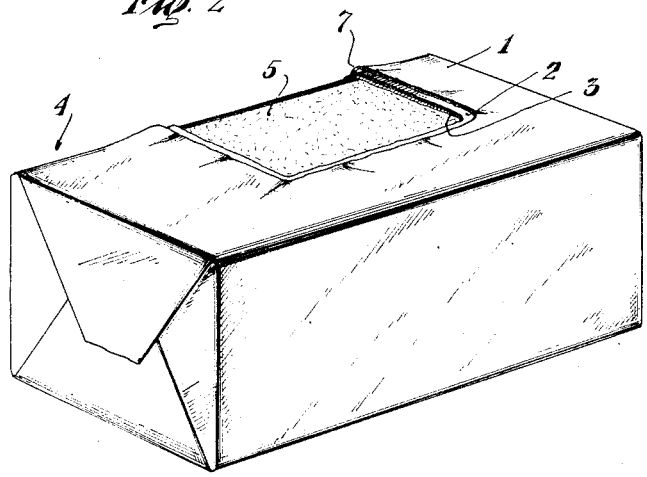
INVENTOR.
Tracy Cowen
BY
ATTORNEYS Patented June 25, 1946

2,402,605

UNITED STATES PATENT OFFICE 2,402,605

MOISTUREPROOF WRAPPER FOR PACKAGING CHEESE AND THE LIKE

Tracy Cowen, Malverne, N. Y., assignor, by mesne assignments, to Standard Cap and Seal Corporation, a corporation of Virginia Application November 4, 1943, Serial No. 508,927

3 Claims. (Cl. 117—76)

This invention relates to an improved wrapping material, and more particularly to a moistureproof heat sealing wrapping tissue having as its base a non-moistureproof regenerated cellulose sheet or film or other cellulosic sheet or film material permeable by moisture, such as, for example, glassine paper, cellulose esters and ethers, and cellulose xanthate and viscose, and which is adapted for use as a wrapping material for wrapping food products which normally contain substantial amounts of moisture and which depend for their freshness and flavor on the retention in them of a high moisture content or from which it is important that air be excluded during storage or in the normal period between manufacture and distribution to the ultimate customer. Among such products are various types of cheese, including particularly pasteurized processed cheese, butter, lard and margarine.

By way of example, in packaging pasteurized processed cheese and similar food products, it is important to use a wrapper that will seal in the original moisture in the cheese and thereby protect its natural freshness and flavor. It is also essential that the wrapper, or at least that surface of it which comes into contact with the cheese, shall be of such nature as not to impart any deleterious taste or odor to the cheese. Accordingly, in using cellulosic materials as wrappers for cheese, it has been customary to apply a wax coating to the surface that is to come into contact with the cheese. However, experience has shown in the past that when wrapped slabs of processed cheese are removed from cold storage cabinets and exposed to normal room temperatures and humidities, moisture condenses on the outer surface of the wrapper. If this wrapper is composed of an outer layer of non-moistureproof regenerated cellulose or other cellulosic material affected by moisture, the condensed moisture will permeate or enter the exposed surface and pass through the sheet causing the cellulose to swell. If an anchored moistureproofing coating is not present adjacent the inner surface of the cellulose wrapper, the wax coating will finally become detached from the cellulose base. When the consumer opens the package this wax coating will adhere to the surface of the cheese. Since the wax coating thus remaining attached to the cheese possesses practically no tensile strength it will break in small pieces when being pulled away from the cheese, causing considerable inconvenience to the consumer.

Moistureproof or anchor coated Cellophane and similar regenerated cellulose films are relatively expensive as compared with plain or non-moistureproofed regenerated cellulose films.

A rather general practice has grown up in recent years of providing wrappers for cheese and other food products consisting of plain or non-moistureproofed Cellophane and similar regenerated cellulose film or sheet materials carrying a coating consisting of a mixture or emulsion of rubber or wax. In these coating compositions the rubber serves to impart flexibility and cohesiveness to the coating. While such wrappers are less expensive than the anchor coated Cellophanes, as heretofore produced they have certain limitations, notably considerable permeability to moisture and only a moderate tensile strength. Moreover, a careful selection and special treatment of the rubber constituent is required in order to avoid tendency to impart odor and taste and to minimize deterioration in storage.

The present invention has for an object to utilize plain, non-waterproofed, regenerated cellulose, glassine and other cellulosic materials permeable by moisture, in forming wax coated, preferably transparent, sheets or films that may be used as wrapping tissues for wrapping food products and other products which normally contain substantial amounts of moisture and which tend to dry out or acquire undesired odors or tastes unless sealed against contact with the surrounding atmosphere.

The invention has for a further object to produce a wax coated wrapping material which may be wrapped around a block of cheese or other food product and heat sealed to itself to form an air-tight package, the sealed character of which remains unchanged despite a state of humidity in the surrounding atmosphere that will cause moisture to permeate the unprotected cellulose base sheet or film to the extent that it eventually disintegrates or separates from the wax coating.

A still further object of the invention is to produce a cellulosic base wrapping material having a surface coating of wax supported upon an intermediate lacquer film which coacts with the wax coating to form a composite structure highly resistant to moisture, which remains self-sustained in case the cellulosic base becomes separated therefrom under the influence of moisture, and which may be readily peeled away from the food product as a unit.

Another object of the invention is to produce a cellulosic base wrapping material having a self-sustaining film thereon characterized by a relatively high tensile strength and limited extensibility such that it will not readily tear when temporarily pulled away from a block of cheese, butter or other food product, and will not stretch sufficiently to break a continuous wax coating carried thereby.

Another object of the invention is to provide a method of preparing the improved wrapping material hereinafter more fully described.

Still another object of the invention is to bring about marked economies in the cost of the finished wrapping material as compared with such products as were heretofore available for the purpose.

My improved wrapping tissue has the further advantage that it shows no tendency to age or deteriorate in storage or on standing as is the case with wax compositions containing rubber. My improved wrapping material has the further advantage that it remains highly flexible at low temperatures.

In describing the invention reference will be made to the accompanying drawing, wherein:

Fig. 1 shows in exaggerated cross-section the arrangement of the coatings and base sheet or film which constitute the improved wrapping material; and Fig. 2 illustrates a perspective view of a cheese package formed with the use of the improved wrapper and showing the self-sustained character of the lacquer-wax coating after the outer cellulose film has separated therefrom.

In accordance with the invention, a water resistant lacquer or other film-forming coating characterized by high tensile strength and limited extensibility is first applied to one side of a plain, non-moistureproofed regenerated cellulose sheet or other cellulosic sheet or film of the general class hereinbefore mentioned. After the lacquer has dried a coating of wax is applied to the same side of the sheet.

A special lacquer that I have found to possess the necessary tensile strength, limited extensibility and water resistance may be formed of a composition containing equal parts by weight of nitrated cotton (nitrocellulose), ½ to 10 sec., and a polyvinyl butyral resin mixed with sufficient plasticizer to impart the desired amount of adhesion and flexibility to the coating. In order to apply the coating, suitable thinners will be used to give it a specific gravity and viscosity that will make it applicable by conventional coating methods.

A specific example of a lacquer solution that may be used is as follows:

| | Parts by weight |
|---|---|
| Nitrated 5 sec. nitro cotton | 20 |
| Polyvinyl butyral, Vinylite XYHL | 20 |
| Triethyl citrate | 12 |
| Denatured alcohol | 100 |
| Acetone | 50 |
| Ethyl acetate | 50 |

A lacquer coating of the above composition may be applied in the form of an exceedingly thin film and yet insure the desired result. Usually a finished lacquer coating of 0.0001" to 0.0002" thickness will suffice for the purpose.

After applying the lacquer solution, the coated film is dried, preferably by passing through a drier wherein the volatile solvents are recovered. Thereafter, a wax coating is applied to the coated side of the film. Any of a wide variety of wax compounds may be used in forming the wax coating, and, in contradistinction to the prior practice of applying a relatively thick wax coating, I find that an entirely satisfactory product is obtained with a wax coating having a thickness between 0.001" and 0.003". Any wax or similar compound that is free from tendency to impart odor and taste may be employed, among others being the paraffin waxes (both crystalline and micro-crystalline), beeswax, spermaceti, candelilla, carnauba and montan waxes, palm wax and ceresin, as well as various other natural or synthetic waxes, either alone or in admixtures. When paraffin wax is used, the higher melting point varieties, such as those melting over 50° C. or better over 60° C., are preferred.

While the invention has been described with particular reference to the use of a lacquer coating containing nitrocellulose of a particular viscosity and one particular polyvinyl butyral resin, it will be understood that many other lacquer and self-sustaining film compositions containing nitrocellulose and a polyvinyl butyral resin as essential ingredients may be formulated to insure the desired result. My investigations show that the essential characteristics required in self-sustaining lacquers and other self-sustaining coating compositions intended for use in forming my wrapping material are a relatively high tensile strength coupled with a limited extensibility, high flexibility even at low temperatures, resistance to moisture and capability of being adhered on the one hand to plain regenerated cellulose and on the other hand capable of adhering to and preferably forming a strong bond with a wax coating disposed thereon. Any self-sustaining coating composition containing as lacquer ingredients nitrocellulose, a polyvinyl butyral resin and a plasticizer which possesses substantially these several characteristics may be used in practising my invention. In place of Vinylite XYHL, other polyvinyl butyral resins differing therefrom in their viscosity characteristics may be employed, provided the amount or kind of plasticizer is appropriately adjusted and chosen having in mind the working properties desired; for example, the higher viscosity Vinylites, XYHM and XYNC, may be substituted.

Higher or lower viscosity nitro cottons may be used depending on the type of coating application to be made. Other plasticizers such as dibutyl phthalate, ortho free tricresyl phosphate, or mono-phenyl or diphenyl phosphate may also be used. The solvent mixture can also be varied depending on the type of drying equipment and amount of drying space available. It will be understood that the proportions of plasticizer and nitrocellulose or the viscosity of the latter will be varied to insure that the final lacquer coating will have the desired tensile strength and limited extensibility characteristics.

When the wrapping tissue is to be used in an environment where it will be exposed to the moisture and humidity conditions and temperature variations involved in the packaging, storing and distribution of food products such as pasteurized processed cheese, the desired result will be insured if the lacquer coating is of such character as to show a tensile strength, when deposited in a film of 0.0015" to 0.002" thickness, of at least 1400 lbs. per square inch, a water absorption—after immersion in water for 24 hours at 25° C. (A. S. T. M. D570–42, Modified)—of not more than 6%, and will not show an elongation of more than 30% in 6 inches when subjected to tension stresses within the limits of its tensile strength.

These values are obtainable with lacquer films produced from suitably plasticized compositions of nitrocellulose and one or more of the above mentioned resins. By way of example, a series of lacquer films of the nitrocellulose-polyvinyl butyral composition more particularly hereinbefore recited and having thicknesses varying from 0.0017" to 0.0018" were subjected to conditioning for three days at 75° F., to 50% relative humidity, and then subjected to tests for tensile strength and elongation. The average tensile strength values of six specimens was 1560 lbs. per square inch. These values were arrived at by employing the A. S. T. M. method, D638–42T, Modified, i. e., 1" x 8" strips of film were tested in a Scott Tensile Tester with 100 lbs. per square inch full scale reading and moving at 12" per minute. The elongation and tensile strength to breaking point were determined on a single ply with the jaws spaced 6" apart. The jaws were then spaced 1" apart and a break made on the same specimen doubled. Another break was made on the same specimen in three thicknesses. The values obtained for these several tests were then averaged, obtaining the resultant value indicated above. The elongation determined in a similar manner was 30% in 6". These films when tested for water absorption showed an average water absorption in 24 hours at 25° C. of 4.6% (A. S. T. M. D570–42, Modified).

Referring more particularly to the drawing, the composite wrapper is shown in cross section in Fig. 1, wherein 1 designates the non-moistureproofed cellulose base sheet, which may be composed of plain Cellophane or another commercial non-moistureproofed regenerated cellulose material, glassine, or other cellulosic sheet material. The lacquer film 2 is shown as deposited upon and adhering to the base sheet 1 and as coated with and bonded to a wax coating 3.

In Fig. 2 a wrapper 4 constituted of the composite structure illustrated in Fig. 1 is shown as wrapped about a block or loaf of processed cheese 5, with the wax coated surface turned inwardly in contact with the cheese. As shown at 7, an area of the wrapper has been subjected to moisture to such an extent that the base sheet 1 has been loosened from the lacquer film and has peeled away without, however, interfering with the sealing action of the film and the wax coating bonded thereto and carried thereby.

While the product has been described with particular reference to its application in the wrapping of perishable food products such as cheese, butter and the like, it will be understood that it will have many other industrial applications. Likewise, it will be understood that the proportions and the ingredients of the lacquer composition may be varied considerably depending upon the strength and other properties required by the intended use of the product.

Various other changes that will be apparent to the person skilled in the art may be made without departing from the scope of the invention which is not to be deemed as limited otherwise than as indicated by the appended claims.

I claim:

1. A wrapping material comprising a film of regenerated cellulose having a lacquer film thereon composed principally of nitrocellulose, polyvinyl butyral resin and a plasticizer, and a wax coating superposed on said lacquer film, said wax coating presenting a continuous exposed surface on its side opposite said lacquer film, and in which said lacquer film and said wax coating coact to form a unitary, self-sustaining, moistureproof residual wrapping film unaffected by separation therefrom of the cellulose film under the influence of moisture.

2. A heat sealing wrapping tissue comprising a film of water permeable regenerated cellulose having a lacquer film thereon comprising:

| | Parts by weight |
|---|---|
| Nitrated 5 sec. nitro cotton | 20 |
| Polyvinyl butyral resin | 20 |
| Triethyl citrate | 12 | and a wax coating superposed on said lacquer film, and in which said lacquer film and said wax coating coact to form a unitary, self-sustaining moistureproof residual wrapping film unaffected by separation therefrom of the cellulose film under the influence of moisture.

3. A method of preparing a heat sealing wrapping material which comprises applying to a water permeable regenerated cellulose film a lacquer solution containing as lacquer ingredients nitrocellulose, polyvinyl butyral resin and triethyl citrate, drying the resulting lacquer film and thereafter applying a wax coating uniformly over said lacquer film.

TRACY COWEN.